US012770114B2

(12) United States Patent
Navar et al.

(10) Patent No.: US 12,770,114 B2
(45) Date of Patent: Oct. 20, 2026

(54) BUILDING CUSTOMER LOYALTY IN A MOBILE ENVIRONMENT

(71) Applicant: BLAZER AND FLIP FLOPS, INC., San Diego, CA (US)

(72) Inventors: Murgesh Navar, San Jose, CA (US); George McMullen, Sunnyvale, CA (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 657 days.

(21) Appl. No.: 16/921,629

(22) Filed: Jul. 6, 2020

(65) Prior Publication Data

US 2020/0402024 A1 Dec. 24, 2020

Related U.S. Application Data

(63) Continuation of application No. 13/550,563, filed on Jul. 16, 2012, now abandoned, which is a
(Continued)

(51) Int. Cl.
*G06Q 30/00* (2023.01)
*G06Q 20/00* (2012.01)
(Continued)

(52) U.S. Cl.
CPC .......... *G06Q 20/00* (2013.01); *G06Q 20/027* (2013.01); *G06Q 20/3223* (2013.01);
(Continued)

(58) Field of Classification Search
CPC .......... G06Q 30/0214; G06Q 30/0224; G06Q 30/0226; G06Q 30/0641; G06Q 20/027;
(Continued)

(56) References Cited

U.S. PATENT DOCUMENTS 6,862,575 B1 * 3/2005 Anttila .............. G06Q 30/0239 705/14.35
6,968,313 B1 11/2005 Oran
(Continued)

OTHER PUBLICATIONS

Tang, Shaojie, and Jing Yuan. "Going viral: Optimizing discount allocation in social networks for influence maximization." arXiv preprint arXiv: 1606.07916 (2016). (Year: 2016).*
(Continued)

*Primary Examiner* — Luis A Brown
(74) *Attorney, Agent, or Firm* — Banner & Witcoff, Ltd.

(57) ABSTRACT

A customer loyalty and gifting service may reward customers who show or are expected to show frequent patronage to a provider of a good or service. A vendor of a good or service may create and provide an offer to one or more existing customers who may choose to purchase, redeem, and/or recommend the offer to other users in the network. The customer may also gift the purchased offer. A reward, such as loyalty points or stars, may then be awarded to the customer to encourage the customer for continued support and patronage. A reward may be redeemed for one or more prizes including gift cards, discounts, or other promotions and deals.

21 Claims, 13 Drawing Sheets

Related U.S. Application Data continuation-in-part of application No. 13/294,134, filed on Nov. 10, 2011, now Pat. No. 10,937,074.

(60) Provisional application No. 61/641,848, filed on May 2, 2012, provisional application No. 61/601,714, filed on Feb. 22, 2012, provisional application No. 61/508,028, filed on Jul. 14, 2011, provisional application No. 61/412,320, filed on Nov. 10, 2010.

(51) Int. Cl.

| | |
|---|---|
| ***G06Q 20/02*** | (2012.01) |
| ***G06Q 20/32*** | (2012.01) |
| ***G06Q 20/38*** | (2012.01) |
| ***G06Q 30/0207*** | (2023.01) |
| ***G06Q 30/0214*** | (2023.01) |
| ***G06Q 30/0226*** | (2023.01) |
| ***G06Q 30/0601*** | (2023.01) |
| ***H04L 9/40*** | (2022.01) |

(52) U.S. Cl.
CPC ....... *G06Q 20/3829* (2013.01); *G06Q 20/387* (2013.01); *G06Q 30/0214* (2013.01); *G06Q 30/0224* (2013.01); *G06Q 30/0226* (2013.01); *G06Q 30/0641* (2013.01); *H04L 63/107* (2013.01)

(58) Field of Classification Search
CPC ........... G06Q 20/3223; G06Q 20/3829; G06Q 20/387; G06Q 20/384
See application file for complete search history.

(56) References Cited

U.S. PATENT DOCUMENTS 7,912,751 B1 3/2011 Allos
7,992,773 B1 8/2011 Rothschild
8,099,109 B2 1/2012 Altman et al.
8,355,955 B1* 1/2013 Mirchandani ......... G06F 16/955 705/26.1
8,424,752 B2 4/2013 Rothschild
8,651,369 B2 2/2014 Rothschild
8,880,421 B2 11/2014 Navar et al.
8,936,190 B2 1/2015 Rothschild
9,516,470 B1* 12/2016 Scofield ............. G01C 21/3697
2003/0028481 A1 2/2003 Flitcroft et al.
2003/0216960 A1* 11/2003 Postrel ............... G06Q 30/0267 705/14.57
2004/0254868 A1 12/2004 Kirkland et al.
2004/0267611 A1* 12/2004 Hoerenz ............ G06Q 30/0241 705/14.13
2006/0200480 A1 9/2006 Harris et al.
2006/0255128 A1 11/2006 Johnson et al.
2006/0280297 A1 12/2006 Fukaya
2007/0106627 A1* 5/2007 Srivastava ............. G06Q 10/10 706/20
2007/0112636 A1* 5/2007 Lucker ............... G06Q 30/0214 705/14.16
2007/0130012 A1* 6/2007 Yruski ............... G06Q 30/0267 705/14.68
2007/0219874 A1* 9/2007 Toulotte ............. G06Q 30/0631 705/26.7
2007/0230704 A1 10/2007 Youn et al.
2007/0288312 A1 12/2007 Wang
2008/0005104 A1 1/2008 Flake et al.
2008/0077488 A1 3/2008 Main et al.
2008/0104172 A1* 5/2008 Craig .................... H04L 67/131 709/204
2008/0154726 A1 6/2008 Bennett et al.
2008/0257952 A1 10/2008 Zandonadi
2008/0281694 A1* 11/2008 Kretz ..................... G06Q 30/02 705/14.64
2009/0018918 A1* 1/2009 Moneypenny ..... G06Q 30/0269 705/1.1
2009/0036095 A1 2/2009 Bickerstaff et al.
2009/0061884 A1* 3/2009 Rajan ................. G06Q 30/0225 455/445
2009/0182634 A1* 7/2009 Park ..................... G06Q 20/204 705/17
2009/0182637 A1* 7/2009 Roberts .............. G06Q 30/0212 705/14.1
2009/0204484 A1* 8/2009 Johnson ............. G06Q 30/0255 705/14.53
2009/0248483 A1* 10/2009 Kiefer ................ G06Q 30/0236 705/14.1
2009/0287929 A1 11/2009 Kolesnikov et al.
2009/0307091 A1* 12/2009 Lilley ................ G06Q 30/0224 705/14.58
2009/0319359 A1* 12/2009 Soza ...................... G06Q 30/02 705/14.44
2009/0327129 A1* 12/2009 Collas .................. G06Q 20/384 709/204
2010/0076850 A1* 3/2010 Parekh ................... G06Q 30/02 705/14.66
2010/0121719 A1 5/2010 Kaplan
2010/0222033 A1* 9/2010 Scott ................... H04M 3/5322 455/414.1
2010/0223186 A1 9/2010 Hogan et al.
2011/0066501 A1* 3/2011 Saxena ................... H04W 4/00 455/456.3
2011/0093328 A1* 4/2011 Woolcott ............... G06Q 30/02 705/14.73
2011/0112892 A1* 5/2011 Tarantino .............. A63F 13/332 705/14.1
2011/0161142 A1* 6/2011 Dunn ................ G06Q 30/0207 705/14.1
2011/0161149 A1* 6/2011 Kaplan .................. G06Q 30/02 709/204
2011/0161233 A1 6/2011 Tieken
2011/0180598 A1* 7/2011 Morgan ............... G06Q 20/425 235/380
2011/0191160 A1 8/2011 Blackhurst et al.
2011/0202401 A1* 8/2011 Magadi .................. G06Q 30/02 705/14.25
2011/0264519 A1* 10/2011 Chan .................. G06Q 30/0251 705/14.49
2011/0320245 A1* 12/2011 Nayak ................ G06Q 30/0207 705/14.1
2011/0320373 A1* 12/2011 Lee ........................ G06Q 10/40 715/758
2012/0136798 A1* 5/2012 Navar ................ G06Q 20/3829 705/27.1
2013/0041731 A1* 2/2013 Navar ................ G06Q 30/0224 705/14.23
2013/0124314 A1* 5/2013 Navar ................ G06Q 30/0251 705/14.66
2013/0218608 A1 8/2013 Huson
2015/0242892 A1* 8/2015 Priebatsch ......... G06Q 30/0255 705/14.53
2016/0048860 A1* 2/2016 Sayler ................ G06Q 30/0267 705/14.64
2020/0402024 A1* 12/2020 Navar ................... H04L 63/107

OTHER PUBLICATIONS

Gil-Or, Oren. “Building consumer demand by using viral marketing tactics within an online social network.” Advances in Management 3.7 (2010): 7-14. (Year: 2010).*

Leskovec, Jure, Lada A. Adamic, and Bernardo A. Huberman. “The dynamics of viral marketing.” ACM Transactions on the Web (TWEB) 1.1 (2007): 5-es. (Year: 2007).*

Robles, Juan Francisco, Manuel Chica, and Oscar Cordon. “Evolutionary multiobjective optimization to target social network influentials in viral marketing.” Expert systems with applications 147 (2020): 113183. (Year: 2020).*

Toros, Nur Undey Kalpaklioğlu Nihal. “Viral marketing techniques within online social network.” Yaşar Üniversitesi E-Dergisi 6.24 (2011). (Year: 2011).*

(56) References Cited

OTHER PUBLICATIONS

Subramani, Mani R., and Balaji Rajagopalan. "Knowledge-sharing and influence in online social networks via viral marketing." Communications of the ACM 46.12 (2003): 300-307. (Year: 2003).*
U.S. Appl. No. 13/294,134 Final Office Action mailed Sep. 23, 2015.
U.S. Appl. No. 13/294,134 Office Action mailed Mar. 27, 2015.
U.S. Appl. No. 13/294,141 Final Office Action mailed Jun. 19, 2013.
U.S. Appl. No. 13/294,141 Office Action mailed Mar. 4, 2013.
U.S. Appl. No. 13/674,913 Office Action mailed Apr. 9, 2014.
U.S. Appl. No. 13/550,563 Office Action mailed Jan. 8, 2018.
U.S. Appl. No. 13/550,563 Final Office Action mailed May 17, 2017.
U.S. Appl. No. 13/550,563 Office Action mailed Jul. 7, 2015.

* cited by examiner

FIGURE 2A
AT&T 3G
10:04 PM
11 %
Papa Franks
buyfi
Now
Places
Deals
InBox
207
Gift Certificate
Papa Franks
Gift Now: $25 Gift Certificate
456 W. Olive Ave.
Sunnyvale
$25
Valid until 2012-08-01 01:59:00
Gift Now
Description
Delicious pizza, pasta and other Italian delicacies made with the freshest

BUILDING CUSTOMER LOYALTY IN A MOBILE ENVIRONMENT

CROSS-REFERENCE TO RELATED APPLICATIONS

This application claims the priority benefit of U.S. provisional application No. 61/508,028 filed on Jul. 14, 2011 and entitled "Building Customer Loyalty Through a Mobile Application," U.S. provisional application No. 61/601,714 filed on Feb. 22, 2012 and entitled "Systems and Methods for Social Media Interfaces to Local Business," U.S. provisional application No. 61/641,848 filed on May 2, 2012 and entitled "Social Gifting," and is a continuation-in-part of U.S. patent application Ser. No. 13/294,134 filed on Nov. 10, 2011 and entitled "Securing Mobile Transactions," which claims the priority benefit of U.S. provisional patent application No. 61/412,320 filed Nov. 10, 2010 and entitled "Systems and Methods for Secure Mobile Transactions." The disclosure of each of the aforementioned applications is incorporated herein by reference.

BACKGROUND OF THE INVENTION

Field of the Invention

The present invention generally concerns social marketing. The present invention more particularly relates to a customer loyalty and gifting application that allows a user in a network of users to discover, purchase, and share offers from vendors and earn and redeem rewards.

Description of the Related Art

The ability to generate new business while sustaining existing consumer patronage is vital to the long-term success of any business. Businesses are constantly attempting to expand their customer base, encourage continued patronage, and augment revenue. Existing methods that encourage the continued support of a business, product, or service may include discount or reward programs (e.g., discount or reward cards), coupons, and promotional mailings or e-mail lists. These methods, however, fail to exploit notable aspects of the digital age including the widespread use of mobile technologies and the popularity and convenience of mobile commerce. These methods also fail to consider constant user interactions via social networks outlets and e-mail.

As the market reach of mobile commerce continues to expand, so too does the need for mobile commerce to efficiently facilitate existing consumer behaviors. Consumers are increasingly spending, a greater proportion of their online time engaging within social networks and completing online business transactions and purchases. Businesses, such as restaurants, theaters, and sporting venues, are beginning to recognize the potential of social media to impact their bottom line. As such, there is a need for a system and method for building and rewarding customer loyalty that considers a customer's use of mobile commerce in the context of social networking interactions.

SUMMARY OF THE INVENTION

A customer loyalty and gifting application may provide offers and rewards to attract new customers and retain customers with proven loyalty. A vendor of a good or service may create and provide an offer, promotion, or deal (e.g., gift card, discount, coupon, etc. . . . ) to one or more existing customers who may choose to accept or purchase the offer. A customer who has accepted or purchased the promotion may redeem the offer for themselves and/or recommend the offer to one or other users in a network. The customer may also gift the purchased offer. A reward, such as loyalty points or stars, may then be awarded to the customer to encourage the customer for continued support and patronage. A reward may be redeemed for one or more prizes including gift cards, discounts, or other promotions and deals. The reward may be based on user habits or behaviors and/or one or more factors including the number of gift promotions sent, the number of visits to the vendor by the user, the amount of money spent with a particular vendor, and the number of promotions or items purchased.

In a first claimed embodiment, a method for building customer loyalty is claimed. Through this method, a parameter associated with a user is received from a computing device. The parameter is matched with an, offer associated with a good or service offered by a vendor and the offer is transmitted to the computing device. Following acceptance of the offer by the user, a reward is transmitted to the computing device.

In a second claimed embodiment, a system for building customer loyalty is claimed. The system includes memory for storing a user parameter and one or more offers. The application server receives the parameter, matches the parameter with an offer, transmits the offer to the computing, device, receives user acceptance of the offer, and transmits a reward to the computing device based on the acceptance.

In a third claimed embodiment, a non-transitory computer-readable medium is claimed. The storage medium includes a computer program that is executable by a processor to perform a method for building customer loyalty. The method includes receiving a parameter associated with a user, matching the parameter with an offer, transmitting the offer, receiving user acceptance of the offer, and transmitting a reward to the user based on the acceptance.

DETAILED DESCRIPTION

Embodiments of the present invention may provide a customer loyalty and gifting application that builds customer loyalty and rewards customers who show frequent patronage to a provider of a good or service. A reward may include loyalty points, stars, badges, or the like, that are redeemable for prizes such as gift certificates, discounts, coupons, and deals associated with a vendor in the network. A reward given to a customer may depend on a variety of factors including offer type, customer actions with a vendor (e.g., the number of visits by the customer at the vendor location, the amount of dollars spent, and the items purchased), and customer interactions with other users in the network. A reward may also be based on the customer profile or registration information.

Figure 1:
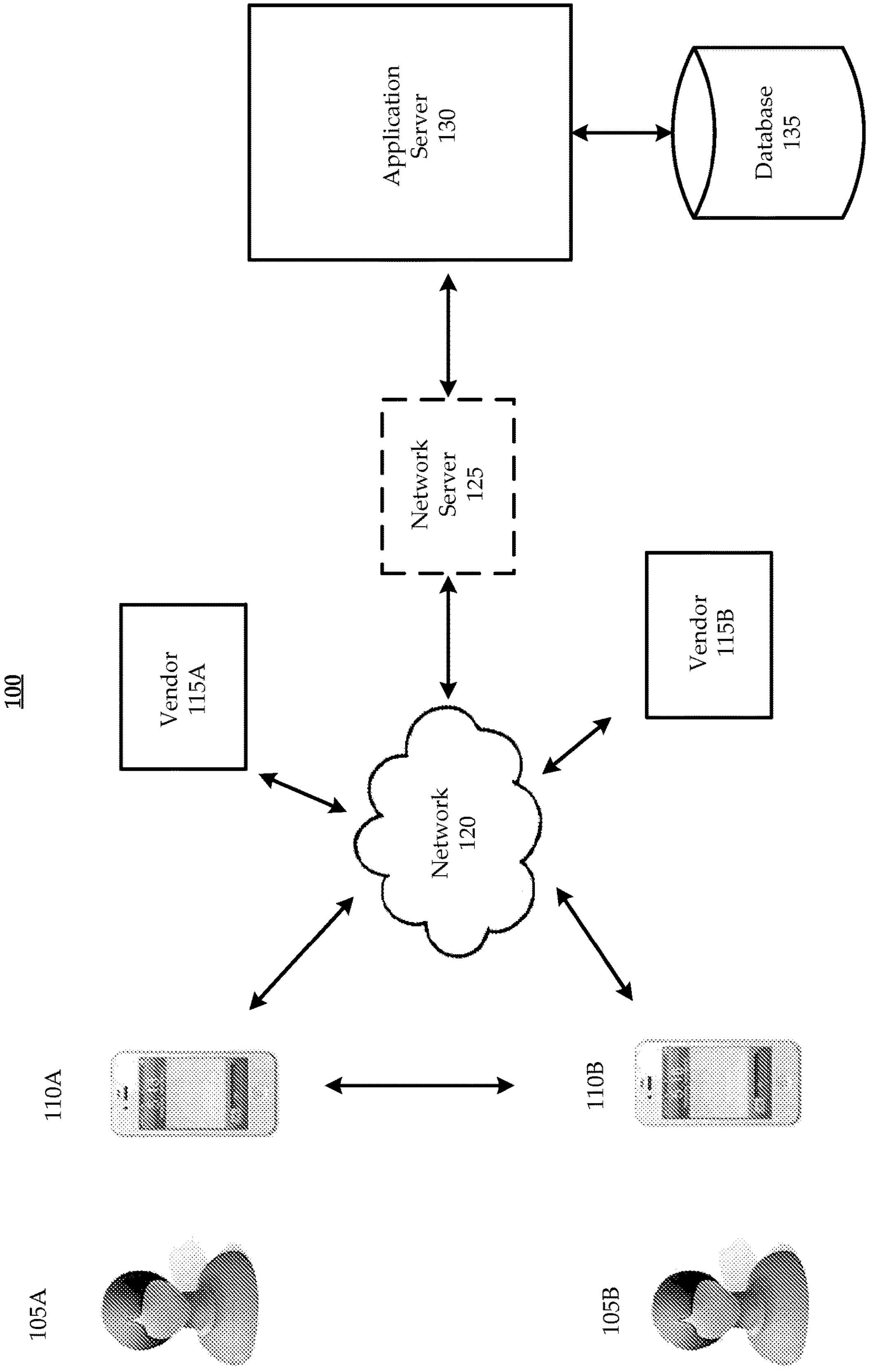
FIG. 1 illustrates a system used for building customer loyalty.

FIG. 1 illustrates a system for building customer loyalty. The system 100 of FIG. 1 includes users (105A, 105B), computing devices (110A, 110B), vendor (115A, 115B), network 120, network server 125, application server 130, and database 135. System 100 may comprise a plurality of users (105A, 105B), vendors (115A, 115B) and computing devices (110A, 110B) in connection with a customer loyalty and gifting application. Using computing device 110A, for example, user 105A may subscribe (e.g., create an account) or register with customer loyalty and gifting application provided by application server 130. Once user 105A has registered with the customer reward service, user 105A may perform a login (i.e., access account) and may access the customer loyalty and gifting application to earn and view offers and rewards based on various actions or interactions. The customer loyalty and gifting application may be integrated with or registered with one or more social networking outlets such as Facebook®.

When registering with the customer loyalty and gifting application, user 105A may be required to input or provide (via computing device 110A) registration information or user data including but not limited to name, user ID, password address, phone number, e-mail address, birthday, age, gender, relationship status, employment status, and education. User 105A may also provide other pertinent data including demographic information, geographic location, interests, hobbies, and preferences about various categories such as dining, events, travel, recreational activities, health, and retail. User registration information and data may be used to generate a profile of user 105A which may be used to tailor offers for user 105A. User data and profile information may be stored in database 135. Registration data and other related user information may be used by application server 130 to match offers to user 105A as well as to determine what award and the amount of such reward to award to user 105A.

System 100 may include database 135 for storing data. Database 135 may store promotions and deals offered by vendors (115A, 115B), user-related information, user payment information, profile information, preferences, parameters, vendor credentials, and other data for use with the customer loyalty and gifting application provided by application server 130. Database 135 may be separate from or integrated with application server 130. Database 135 may also store any updates to user data or profile data or vendor data received from/provided by user 105A and vendor 115A, respectively.

Computing devices 110A and 110B are inclusive of a general purpose computing device capable of accessing information over a network. Computing devices 110A and 110B may be any computing device known in the art such as a workstation, laptop computer, net book computer, tablet computer, mobile device, cellular telephone, or the like that can communicate over network 115. Computing devices 110A include software and/or hardware capable of sending, receiving, and processing data such as user profile or registration data. Computing device 110A may receive data from user 105A and send the data over network 120 to application server 130 for processing. Computing devices may also offer location-based information such as that generated through cellular network base stations, IP network access, or GPS data.

Network 120 is inclusive of any communication known in the art such as the Internet, Local Area Network (LAN), Wide Area Network (WAN), intranet, extranet, private network, or other network. Application server 130 may be accessed via optional network server 125. Network server 125 may receive and process data and/or requests from computing device 110A. For example, user 105A may request and provide data to become a registered subscriber with the customer loyalty and gifting application provided by application server 130. Processing the data and/or request may include sending data to application server 130, receiving a response from application server 130 and sending a response or data to network server 125. Network server 125 may then forward the response or data to computing device 110A.

In addition to hosting the customer loyalty and gifting application, application server 130 may process credit card payments associated with offers, deals, and gifts purchased by users (105A, 105B). Application server 130 may also manage and track offer issuance and sales such as the activation, payment, load balance, and redemption associated with purchased gift certificates or stored value cards. In one embodiment, credit card payments may be received, processed, and managed separately via a payment or point-of-sale gateway communicatively coupled to application server 130. Application server 130 may serve as a proxy to connect users and their payment information to the payment processor or point-of-sale (POS) gateway of a vendor 115A. Vendors (115A-115B) may each have an account connected or linked to one or more preferred or selected available POS gateways. Credit card or other payment information from a user 105A may be associated with a POS gateway using credentials of the vendor 115A. In another embodiment, computing device 110A may be directly coupled to the POS gateway.

Similarly, the management of monetary amounts associated with gift certificates and stored value cards may be handled by a separate, stored value card gateway. In one embodiment, application server 130 may be integrated with or utilize existing payment processor systems and platforms known in the art such as the payment system offered by Heartland Payment Systems, Inc. Application server 130 may also serve as a proxy to connect users and their stored value card information to the stored value card gateway. In another embodiment, computing device 110A may be directly coupled to the stored value card gateway.

Application server 130 may be implemented in a general computing device that otherwise communicates with database 135 and network server 125. An example of such a device is the general computing system illustrated in FIG. 6. One or more software applications or modules may be stored in memory and executable by a processor (not shown) at application server 130. The present customer loyalty and gifting application may be implemented by one or more processors that execute instructions stored in one or more memory mediums. The executed instructions may result in the processor(s) generating and providing one or more graphical interfaces. FIGS. 2A-3C and 5A-5F illustrate examples of interfaces that may be used to implement embodiments of the present invention.

Figure 2A:
FIGS. 2A-2C illustrate interfaces for displaying an offer provided by a vendor.

Vendors (115A, 115B) may include any provider of a good and/or service. Vendor 115A may provide an offer or deal to one or more users in the network to promote a business and its product or service offerings. In one embodiment, the offer is a gift certificate for a particular amount that is redeemable with a vendor in the network immediately or in-store (e.g., manually presented to and processed or scanned by the vendor). A gift certificate may include a stored value card. A gift certificate may be used as a form of payment with a vendor 115A and a purchase amount may be deducted from the gift certificate amount until the value of the certificate is depleted. FIG. 2A illustrates an interface displaying a gift certificate.

Figure 2B:
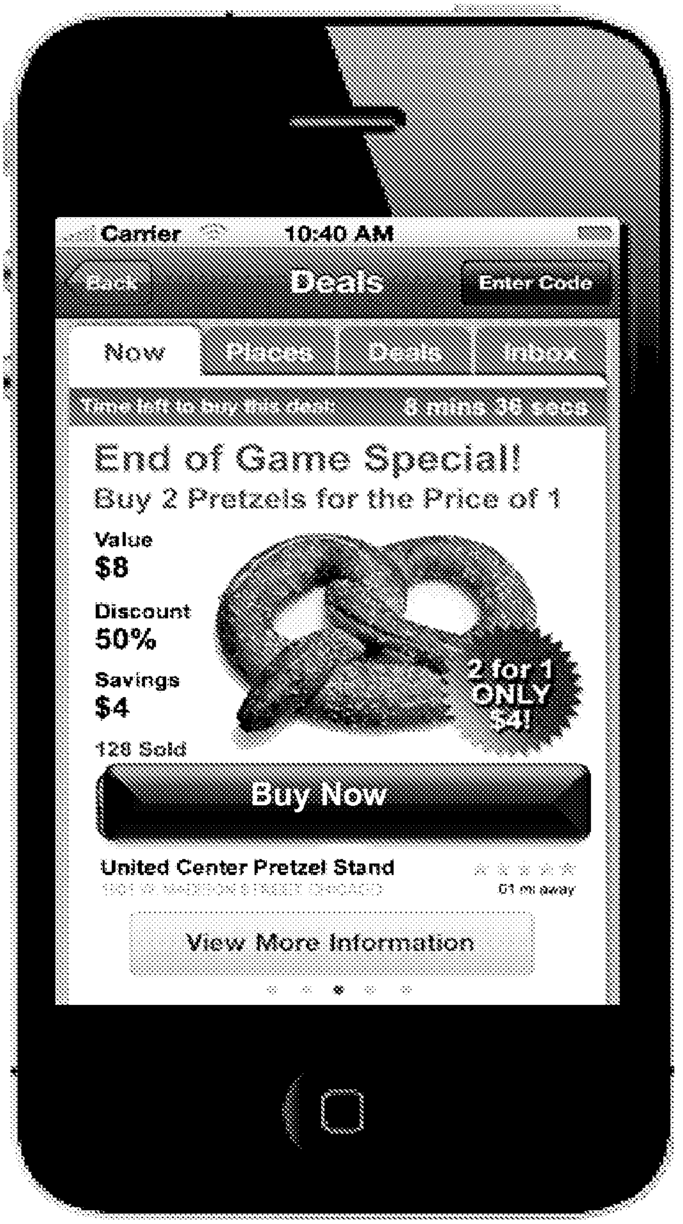

In another embodiment, the offer is a discount or coupon. A coupon, for example, may be a general coupon that is made available and pushed to all registered users of the customer loyalty and gifting application. FIG. 2B illustrates an interface displaying, a coupon. A coupon may be tailored to particular users and offered, for example, to those users determined by application server 130 to be the highest spenders, recent customers, frequent customers, or local customers. A coupon may also be based on user profile or registration information. An offer may include or be based on various elements such as a complementary product, a fixed discount on a total purchase over a specific amount, a percentage discount on total purchase over a specific amount, a percentage discount on a particular product or service, buy-one-get-one free, buy-one-get-second-one-half-off, buy-one-get-second-one-discounted-by-X-percent, or the like.

Figure 2C:
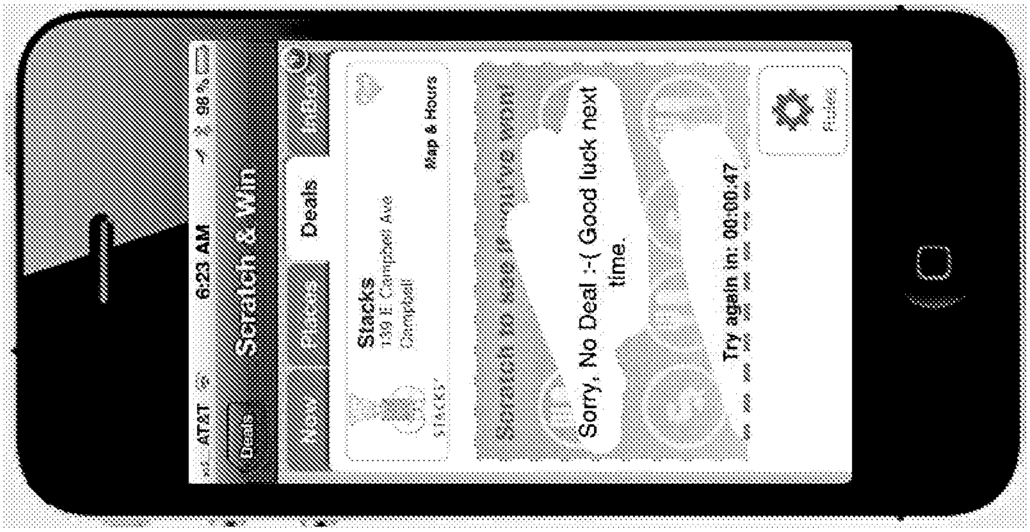
Figure 2C:
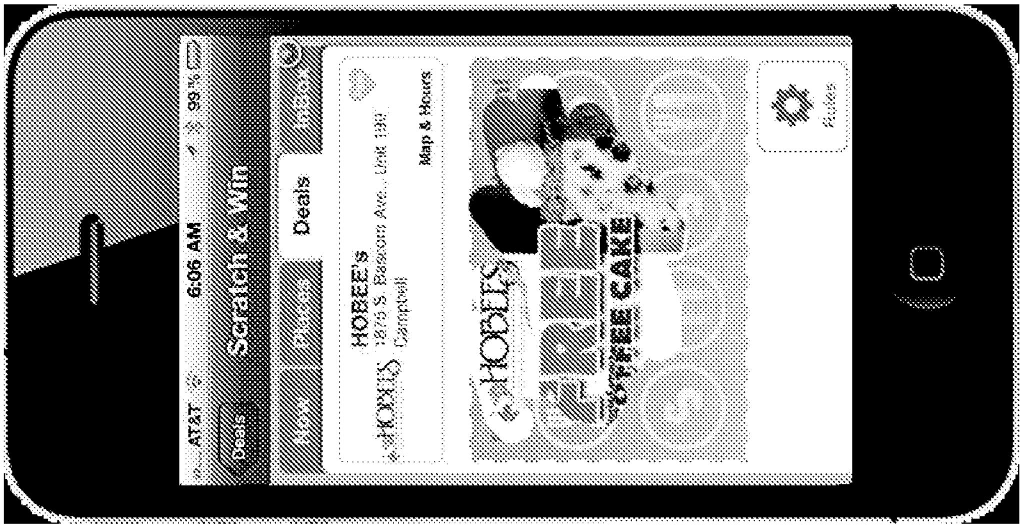

In another embodiment, the offer may come in the form of a scratch card or scratch type coupon that provides a user with the ability to scratch and play for a chance to win a coupon or other deal or promotion. FIG. 2C illustrates interfaces for displaying a scratch type coupon offered by a vendor. Further details regarding coupons, deals, and promotions are described in U.S. patent application Ser. No. 13/294,141 which is incorporated herein by reference.

Figure 3A:
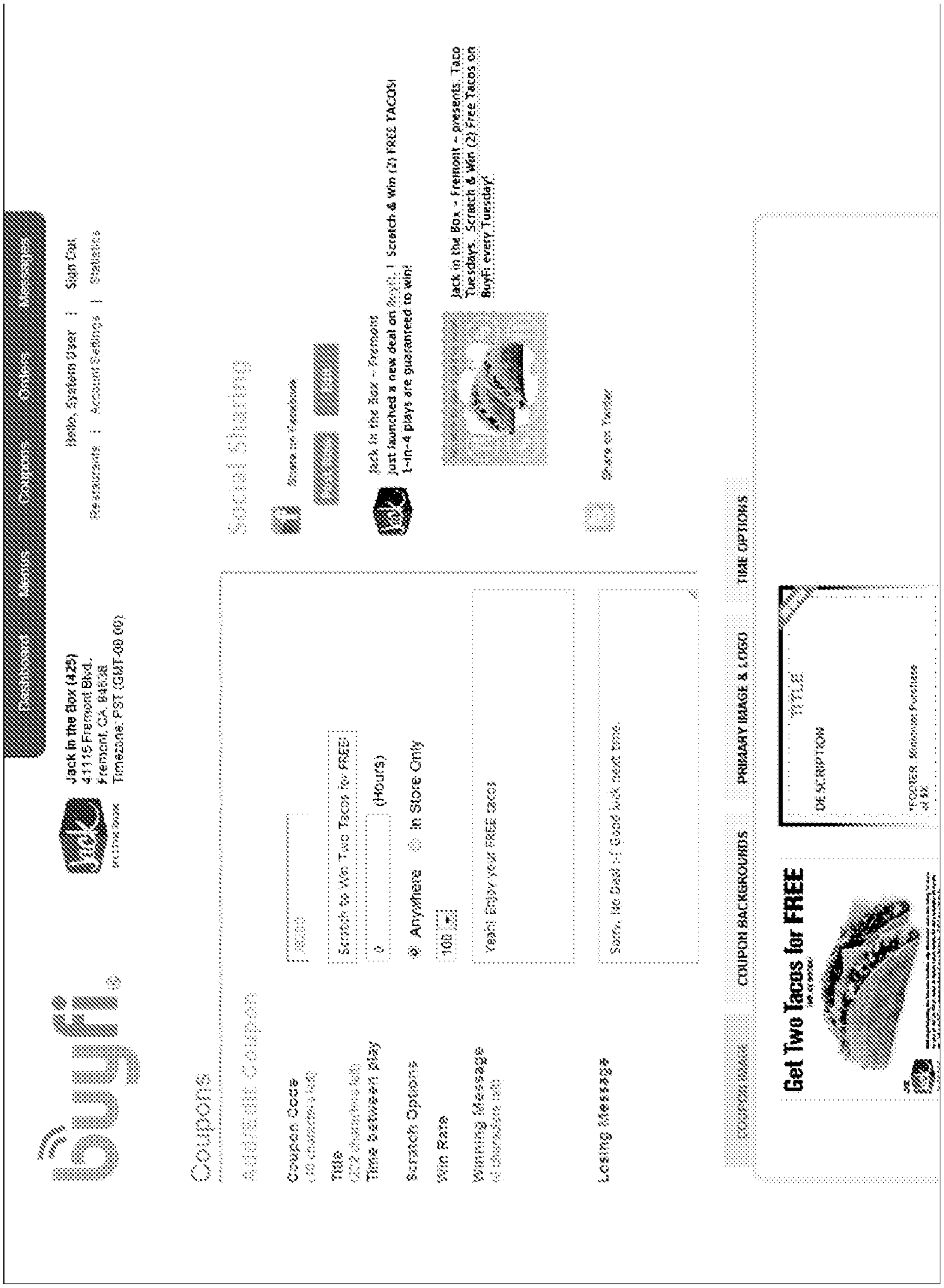
FIGS. 3A-3C illustrate interfaces for offer creation and presentation.
Figure 3B:
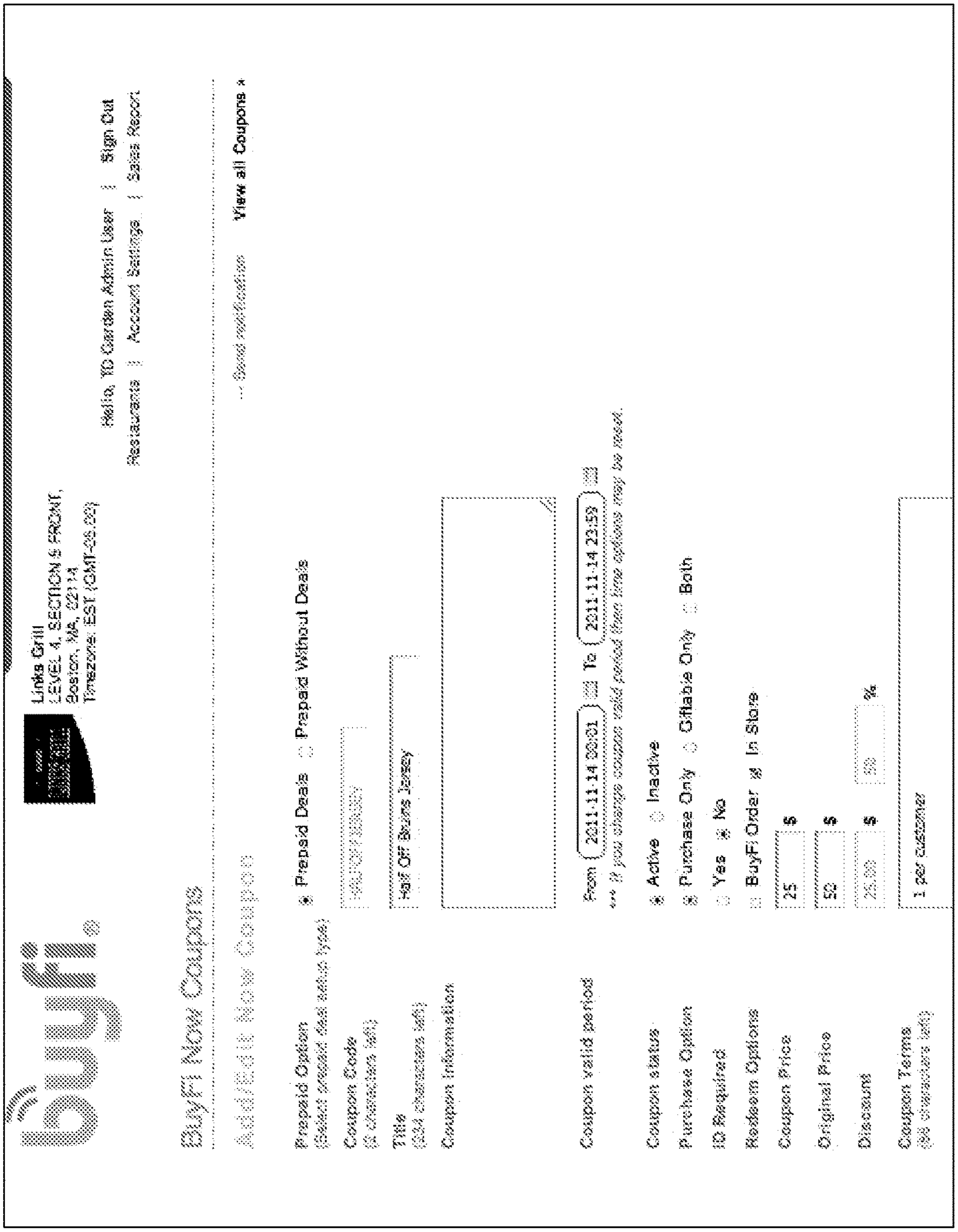
Figure 3C:
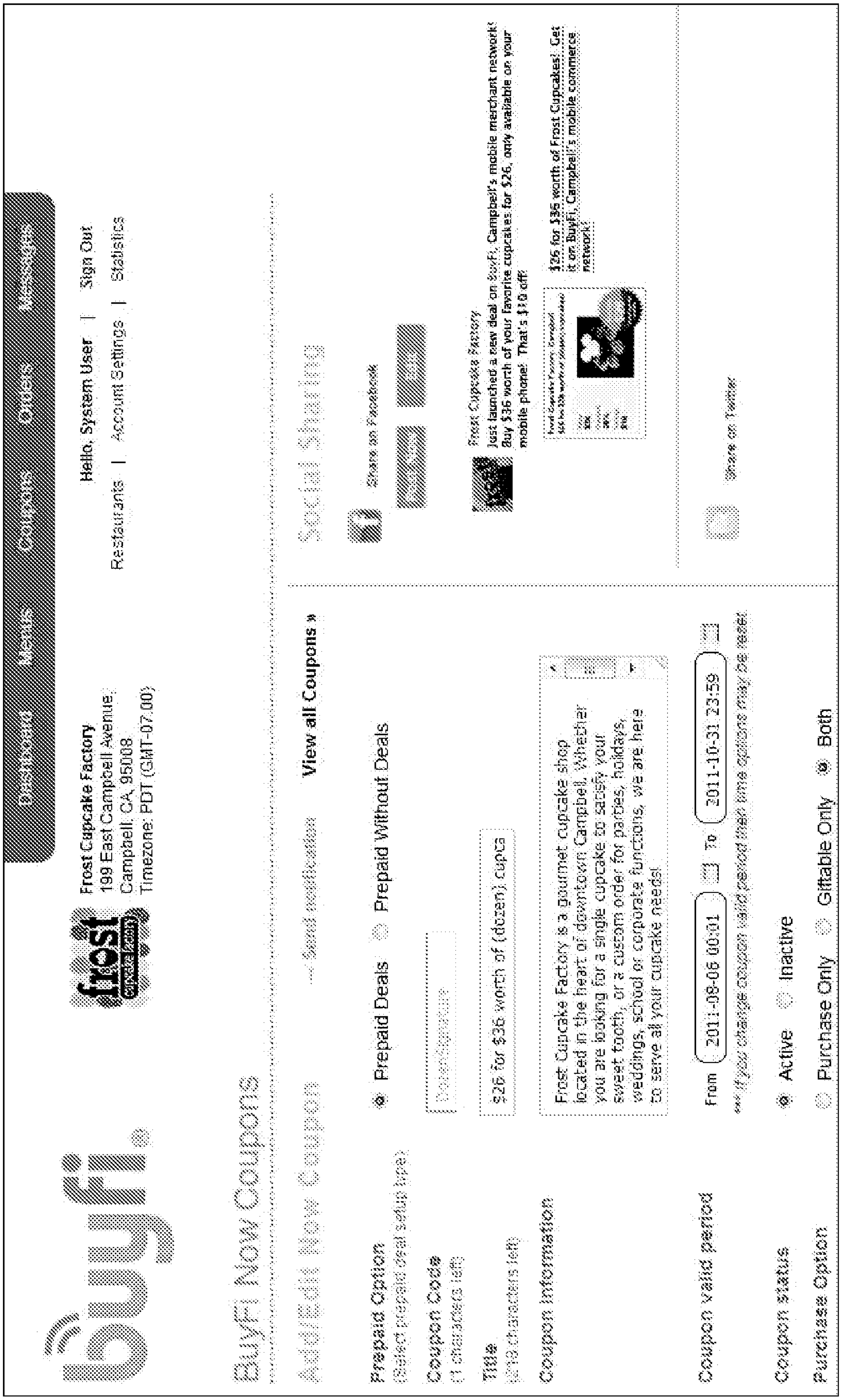

The present customer loyalty and gifting application may allow a vendor 115A to create an offer to present to one or more users in the network or social networking outlet. FIGS. 3A-3C illustrate interfaces for offer creation and presentation. Vendor 115A may register as a participating vendor or merchant with the customer loyalty and gifting application. Vendor 115A may provide various details regarding the vendor (e.g., name, description, logo, etc.) and information regarding the offer, coupon, or scratch card such as coupon title, time between scratch plays, coupon information, offer period, price, discount, and terms.

Application server 130 may take the information provided by the vendor 115A and generate the offer. Vendor 115A may specify when the offer is to be published. A generated offer may be automatically pushed or published to users of the customer loyalty and gifting application and/or to a media feed of a social networking outlet such as Facebook®. An alert or notification regarding a newly generated offer may also be sent to user 105A by application server 130. Where the offer is published to a social media feed, application server 130 may track various statistics and publish any updates regarding the published offer such as the number of offer redemptions or the number of plays and wins with respect to scratch cards. Via application server 130, vendor 115A may also control the number of deals or promotions offered and the number of scratch card winners within specified time periods.

Figure 4:
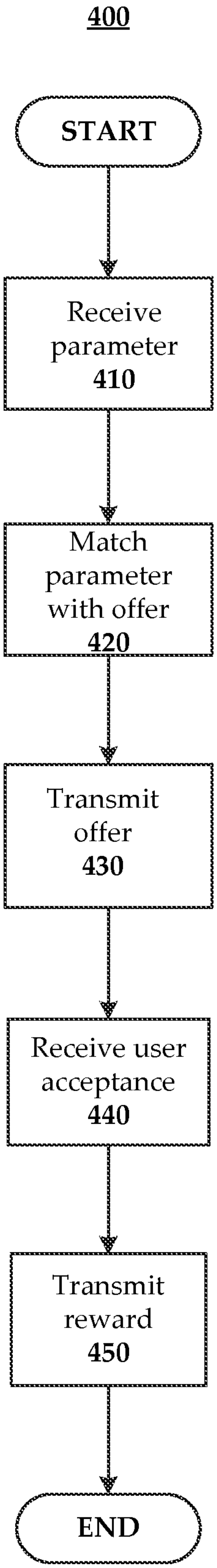
FIG. 4 illustrates a method for building customer loyalty.

FIG. 4 illustrates a method for building customer loyalty. The steps identified in FIG. 4 (and the order thereof) are exemplary and may include various alternatives, equivalents, or derivations thereof including but not limited to the order of execution of the same. The steps of the method of FIG. 4 (and its various alternatives) may be embodied in hardware or software including a non-transitory computer-readable storage medium (e.g., an optical disc or memory card) having instructions executable by a processor of a computing device. A user may launch or activate the method of FIG. 4 by opening or activating an application in a computing device such as a mobile device.

The method 400 of FIG. 4 may increase vendor exposure with the aim of augmenting the purchasing activities of existing customers, attracting new customers, and increasing profits. At step 410, a parameter is received from a computing device associated with a user. A user parameter may include any action, interaction, attribute, or characteristic associated with the user that may be considered in determining how to encourage the user to support a vendor or reward the user for supporting a vendor. A user parameter may be the real-time location of a computing device associated with the user. For example, the real-time location of a user may be at or near the venue of a local merchant or service provider. User location may be determined by any positioning, technology known in the art such as global navigation satellite systems (e.g., GPS or GNSS), real-time locating systems, or local positioning systems. A user parameter may also include special events or occasions including holidays, birthdays, anniversaries, or any other date noted by the user. Such events or dates may be accessed, retrieved, or pulled by application server 130 from a calendaring application stored in computing device 110A associated with user 105A.

A user parameter may further include any action performed by the user or any interaction between the user and a vendor. A parameter, for example, may include indicia of a purchase or transaction completed with the vendor or details about the purchase transaction such as the specific goods or services purchased, the frequency of a purchase transaction, or the purchase amount. A parameter may also include indicia of a purchase or transaction completed with a second vendor whose good or service is similar to or in competition with the good or service offered by a first vendor. A parameter may also include indicia of the redemption of a previously generated offer received by the user from a vendor.

Where a user is communicatively coupled to another user in a network via the reward program service or via a social network (e.g., Twitter®, Facebook®, or Yelp®), a parameter may include information stored in a user profile of a second user, wherein the information indicates a preference by the second user for a particular good or service or a vendor. For example, where user A and user B are connected via a social network (e.g., users A and B are “friends” or “contacts” of one another) and user B has indicated restaurant X as a “favorite,” such information may be used to generate an offer for user A based on the friendship or connection between user A and user B. The system may thus leverage the friendship or real-world relationship of one person who favors a vendor, good, or service such that the friend of that person is incentivized to try the vendor, good, or service, or purchase a gift. Alternatively, one user may seek to have a second user (their friend) join them in purchasing the good or service thus resulting in increased customer traffic.

A user parameter may also include user feedback. Feedback may include any data transmitted from the computing device by the user such as a comment, criticism, rating, posting, or evaluation submitted by the user regarding a particular vendor or good or service provided by a vendor. For example, feedback may be in the form of an actual review or rating. Feedback may also include an interaction between two users in a social network. For example, user A may post a comment to user B about a specific product, service, or vendor. Feedback may be in the form of a posting or message on a social, networking site, an e-mail message, a short message service (SMS) message, or the like.

At step 420, application server 130 matches the parameter with one or more offers made available by vendors (115A, 115B) of a good/service. Application server 130 may receive and store one or more offers received from a vendor (115A). Vendor offers may also be stored in database 135. When matching a parameter to an offer, application server 130 may perform the matching, based on one or more rules such as priorities or preferences specified by the vendor 115A. A vendor 115A may prioritize the matching of an offer or require the presence or absence of one or more user parameters before an offer is presented to a user. For example, a vendor 115A may specify that the user location be within a certain radius of the business venue and/or that the user be part of a particular demographic group (e.g., male between the ages of 30-40). As another example, a vendor 115A may choose to award a coupon of "10% discount off entire purchase" before offering "buy-one-meal-get-one-free" coupon if it is the user's first visit to the business. Application server 130 may also match a user parameter with one or more offers based on user profile or registration information, or other user-related information such as preferences, buying habits, purchase histories, user friend/network connections in the customer loyalty and gifting application or other social network outlet, or the like.

After the user parameter is matched with a specific vendor offer in step 420, application server 130 transmits the offer to computing devices (110A, 110B) in the network at step 430. The transmitted offer may be displayed on a computing device 110A along with one or more other offers, for example, in a list format. The offer may be generated in real-time from various offer elements (e.g., a certain percentage off a particular product) or may be selected from a series of available offers by the vendor. The offer may thus be created on the fly from real-time data to be as timely and relevant as possible or may be selected from a pool of offers that have previously been generated and approved by the vendor. The vendor, for example, may offer a complementary product (i.e., one free glass of orange juice), a fixed discount on a total purchase over a specific amount (i.e., $5 off a purchase of $20 or more), a percentage discount on total purchase over a specific amount (i.e., 10% off a purchase of $20 or more), a percentage discount on a particular product or service, or the like. In the case of real-time offers, the vendor may implement certain limitations or controls such as limiting the maximum percentage off any given product, prohibiting discounts on certain products, or requiring that a user have a specific profile to be given access to certain offers.

After transmitting an offer at step 430, application server 130 may receive acceptance of the offer by user 105A wherein acceptance includes a purchase of the offer. Users (105A, 105B) may choose to purchase the offer for themselves or gift the offer to another user in the network. User 105A may also accept the offer by recommending the offer to one or more users in the network. Acceptance by user 105A may also include receiving a payment for the offer at application server 130.

After receiving user acceptance at step 440, application server 130 may transmit a reward to computing device 110A at step 450. A reward may include or more loyalty points, stars, badges, or the like that are redeemable with a particular vendor for prizes offered by the vendor and selected by user 105A. In one embodiment, the reward is not loyalty points but a second offer for a good or service. The second offer may be redeemable with the vendor of the purchased offer or a different vendor.

User 105A may earn loyalty points in a number of ways. For example, the reward (i.e., number of loyalty points awarded) may be based on one or more user behaviors such as the purchase of an offer, the redemption of the offer by the user 105A, a recommendation of the offer to one or more user in the network, or the gifting of an offer. Rewards may also depend on a profile of the user or habits such as the number of gifts sent to one or more other users in the network, the number of visits made by user 105A to vendor 115A, and the amount of dollars spent with the vendor 115A. A reward may also be based on the purchase price of the offer. A prize may include a gift certificate, discount, or coupon associated with a vendor in the network. A prize may also include cash or other products or services with a particular vendor. The earning and redemption of loyalty points by user 105A encourages continued business for vendor 115A.

Figure 5A:
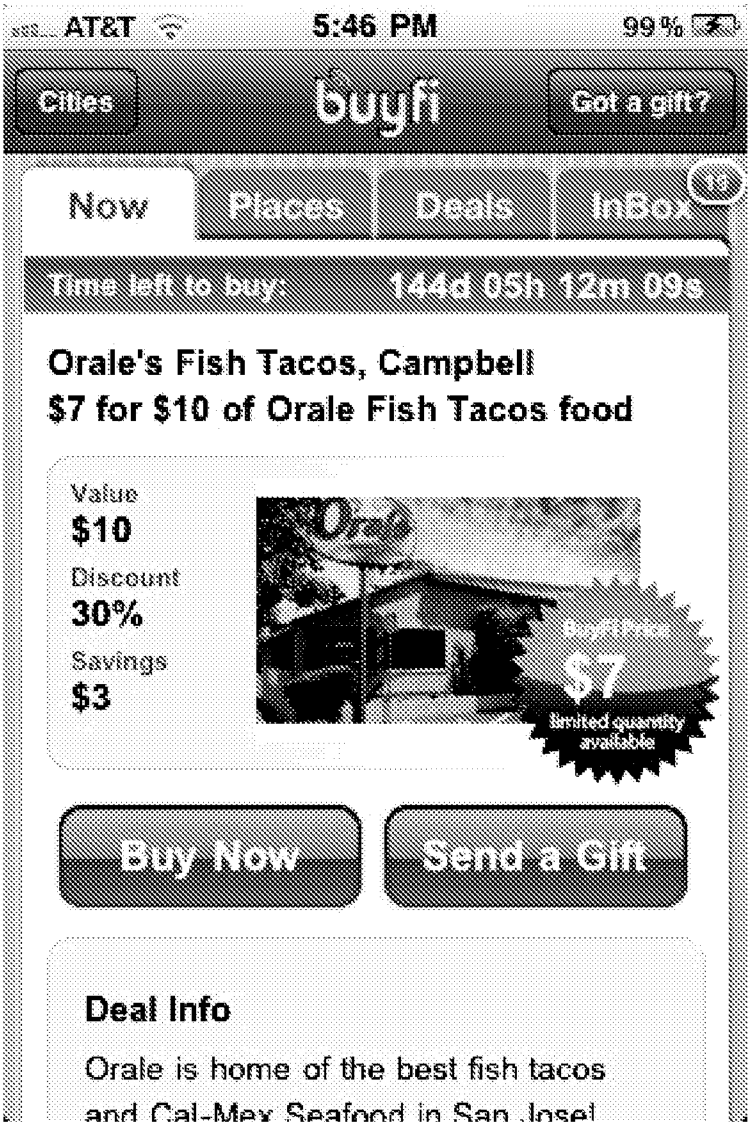
FIGS. 5A-5F illustrate interfaces for the gifting of an offer to a gift recipient.

The present invention facilitates the purchase and subsequent gifting of an offer. FIGS. 5A-5F illustrate interfaces for the gifting of an offer to a gift recipient. Using a computing device 110A, a user 105A may purchase a gift for himself/herself, friends, or family. An offer from vendor 115A may be presented to one or more users in the network via computing device 110A. FIG. 5A illustrates an interface for an offer for purchase. User 105A may purchase the offer by selecting or activating the "Buy Now" button or may gift the offer by activating the "Send a Gift" button.

Figure 5B:
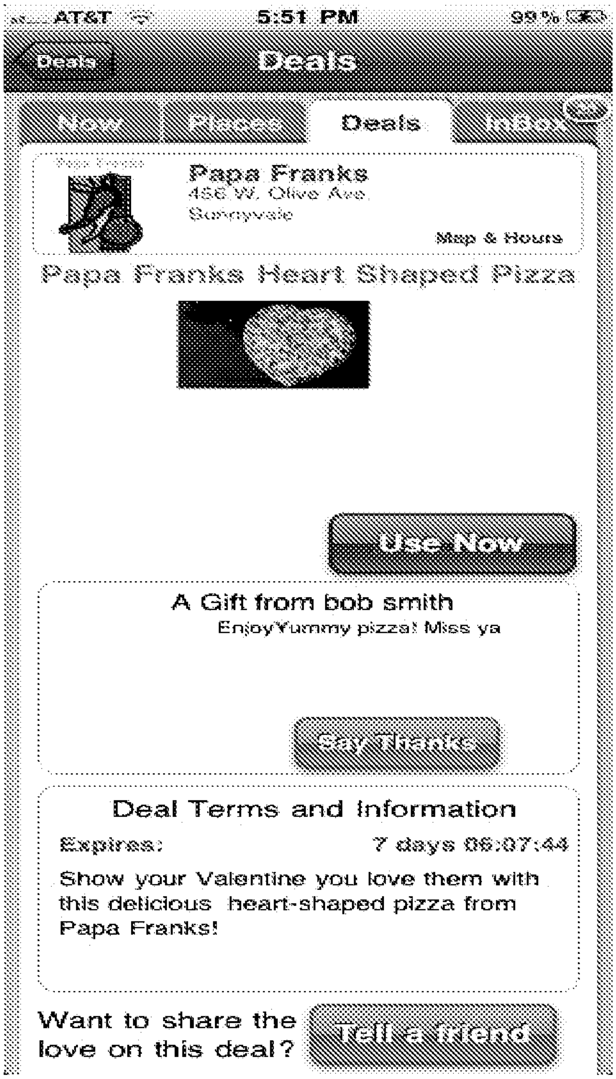

User 105A may submit a gift note to accompany the gifted offer to a gift recipient. A gifted offer may be sent to a gift recipient immediately or at a later time as specified by user 105A. FIG. 5B illustrates an interface notifying a gift recipient that a gift has been received. A gift recipient may send an acknowledgement or thank you note to a sender of the gifted offer by activating a "Say Thanks" button as shown in FIG. 5B. The gift recipient may redeem the gifted offer by activating, the "Use Now" button and/or recommend the gifted offer to another user of the network by activating the "Tell a Friend" button as shown in FIG. 5B. A gift recipient may or may not be a registered user of the customer loyalty and gifting application. Where the gift recipient is not a registered user, the recipient may receive an e-mail message including the gift note from user 105A and instructions on how to access the gift, which may include registration and installation of the customer loyalty and gifting application on a computing device of the gift recipient.

Figure 5C:
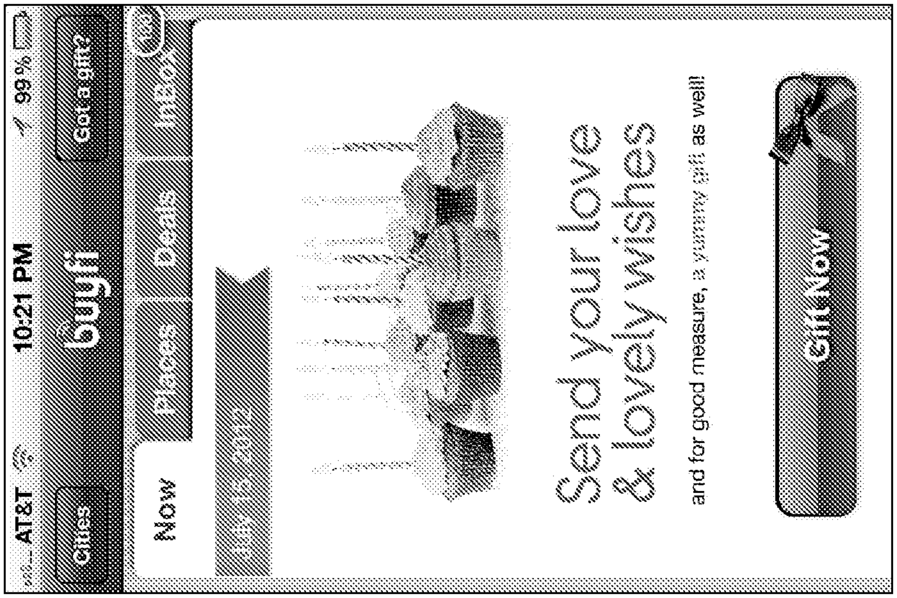
Figure 5D:
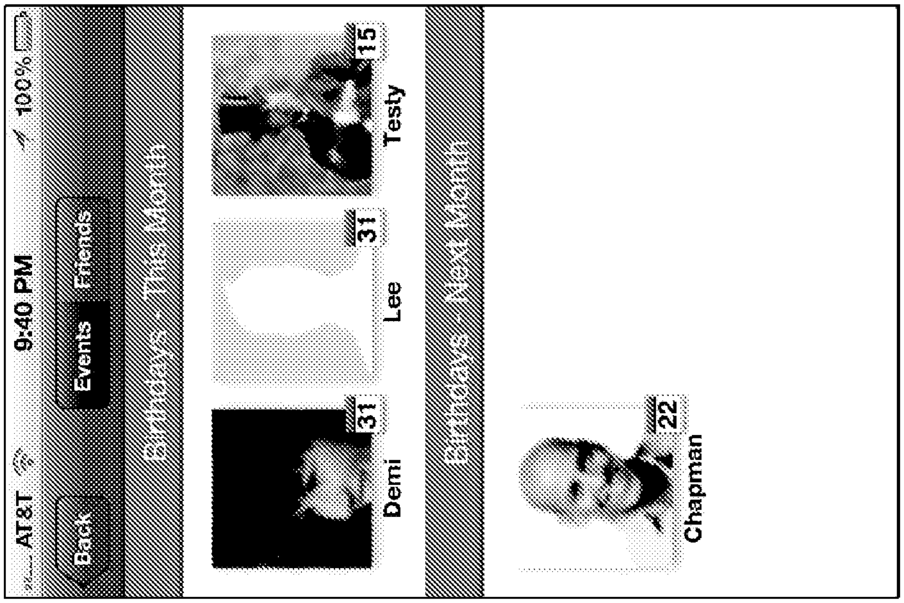
Figure 5E:
Figure 5F:
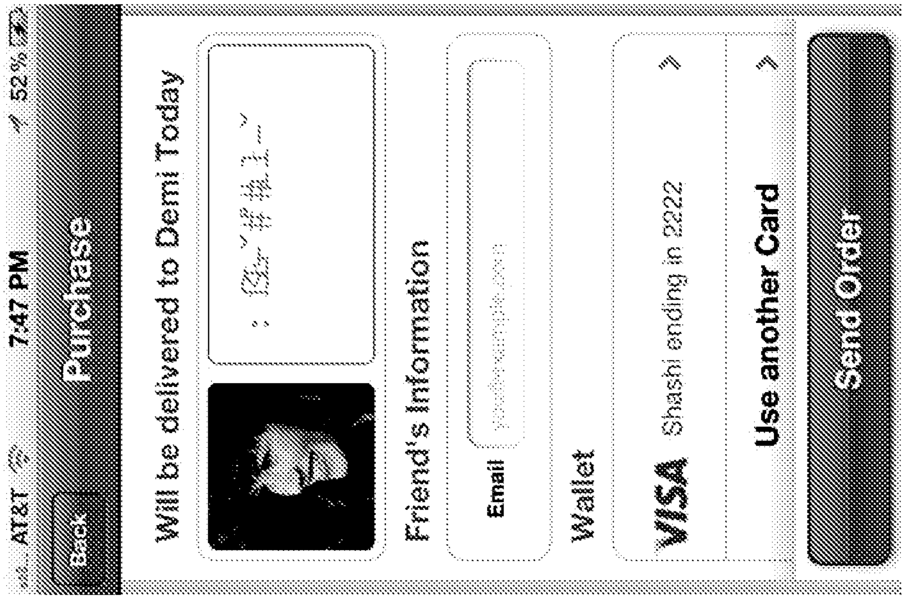

In one embodiment, application server 130 may send reminders or notifications to user 105A regarding special events or occasions including holidays, birthdays, anniversaries, or any other date noted by the user that may encourage, prompt, or remind the user to send a gift to another user in the network. FIGS. 5C-5D illustrate interfaces including a reminder or notification that may be sent by application server 130 to user 105A. FIGS. 5E-5F illustrate additional interfaces for gifting an offer to another user in the customer loyalty and gifting application or a social network outlet. Application server 130 may suggest available offers to gift to another user as shown in FIG. 5E. As described above, an available offer may be tailored or matched to a user based on profile or user-related information (e.g., preferences, habits, user network or friend connections) or a user parameter. Using a computing device 110A, user 105A may choose an available offer to send to a gift recipient and process a payment for such offer using a previously stored credit card as shown in FIG. 5F.

Figure 6:
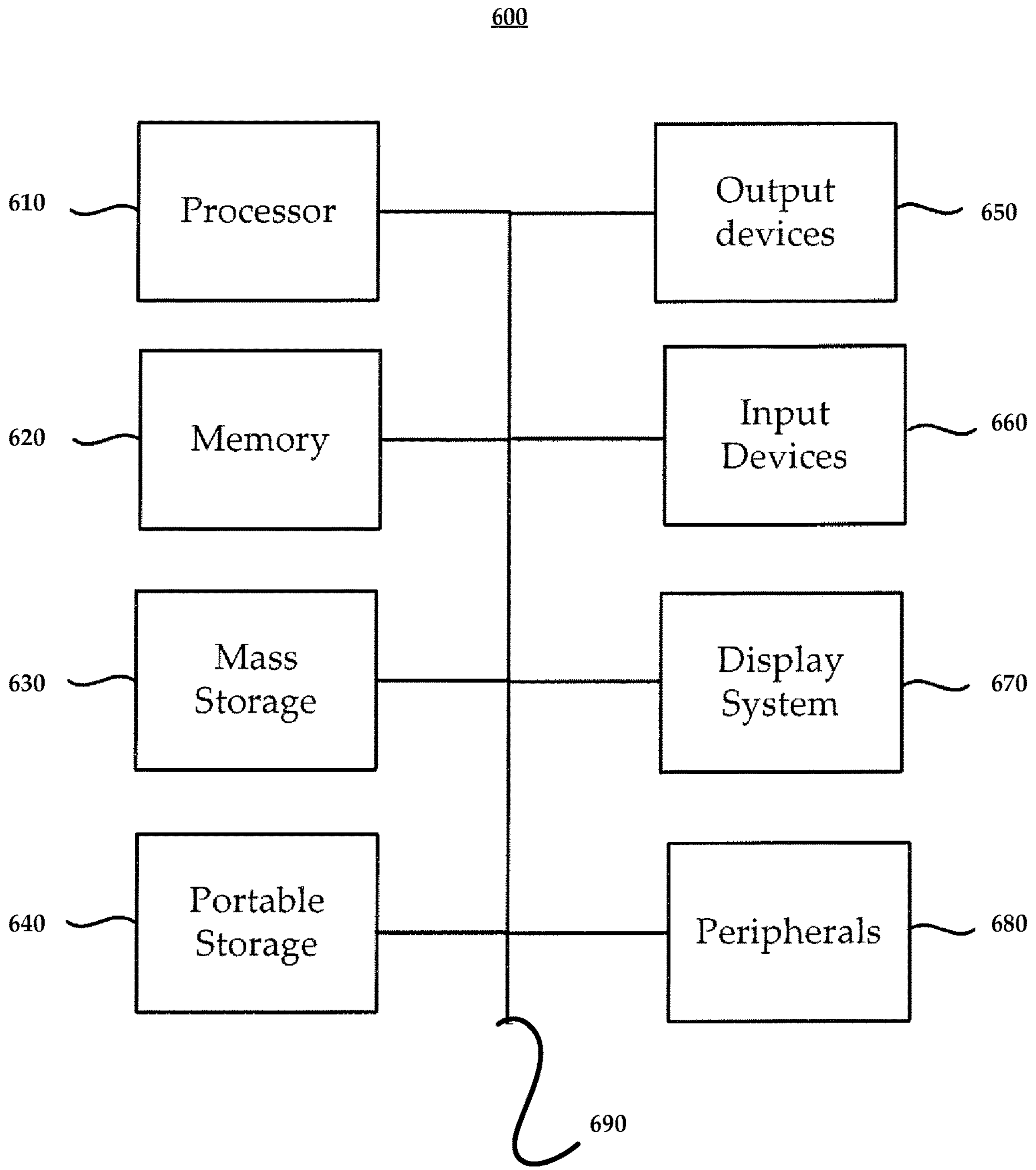
FIG. 6 illustrates a computing system that may be used to implement an embodiment of the present invention.

FIG. 6 illustrates a computing system 600 that may be used to implement the present technology. System 600 of FIG. 6 may be used to implement computing devices 110A and 110B, network server 125, application server 130, and database 135 in the context of the system of FIG. 1. The computing system 600 of FIG. 6 includes one or more processors 610 and memory 620. Main memory 620 stores, in part, instructions and data for execution by processor 610. Main memory 620 can store the executable code when in operation. Main memory 620 may also include a database such as database 135 illustrated in FIG. 1. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. The components, however, may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 may store the system software for implementing embodiments of the present invention for purposes of loading software into main memory 620.

Portable storage device 640 operates in conjunction with a portable nonvolatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network, interfaces, and monitors.

Display system 670 may include a liquid crystal display (LCD) or other suitable display device. Display system 670 may receive textual and graphical information, and process the information for output to the display device.

Peripherals 680 may include any type of computer support device to add additional functionality to the computer system. For example, peripheral device(s) 680 may include a modem or a router.

The components contained in the computing system 600 of FIG. 6 are those typically found in computer systems that may be suitable for use with embodiments of the present invention and are intended to represent a broad category of such computer components that are well known in the art. Thus, the computing system 600 of FIG. 6 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows Mobile, or iOS. The steps of the method of FIG. 4 (and its various alternatives) may be performed by a module or engine stored on a computer readable storage medium (e.g., optical disc, memory card, etc.) comprising instructions executable by a processor of a computing device.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claims and otherwise appreciated by one of ordinary skill in the art.

What is claimed is:

1. A method for tailored messaging, the method comprising:

identifying that a first user device associated with a first user is communicatively coupled to a network;

identifying a connection between the first user and a second user;

receiving a user parameter identifying a preference associated with the second user;

receiving one or more offers from a vendor and one or more rules specified by the vendor;

matching the user parameter with an offer of the one or more offers, based on the one or more rules specified by the vendor;

generating, in real time, a tailored discount for the first user based on the matched offer, the preference associated with the second user and the one or more rules specified by the vendor, wherein the preference associated with the second user comprises user feedback from the second user comprising a comment or criticism submitted by the second user in the form of a posting or message on a social networking site, an email message, or a short message service (SMS) message regarding the vendor or a good or service provided by the vendor;

wherein generating the tailored discount comprises implementing limitations or controls on the tailored discount, based on the one or more rules specified by the vendor, by one or more of:

limiting a maximum percentage discount applied to certain goods or services, or prohibiting discounts on certain goods or services;

transmitting the tailored discount to the first user device over the network;

displaying, at the first user device, the tailored discount;

receiving, at the first user device, selection of a user interface element displayed within the tailored discount, wherein the selection of the user interface element causes the tailored discount to be sent to a second user device associated with the second user, and wherein sending the tailored discount to the second user device enables the second user device to install an application, if not previously installed, configured to display the tailored discount, wherein the application is hosted by an application server, and wherein the application server comprises a proxy between the second user device and one or more of: a point-of-sale gateway for the vendor or a stored value card gateway;

scanning, by a device of the vendor and via the application, the tailored discount; and redeeming, by the vendor, based on scanning the tailored discount, and on behalf of the second user, the tailored discount, wherein redeeming the tailored discount comprises one or more of:

processing the tailored discount and credit card payment information with the point-of-sale gateway, or processing the tailored discount and stored value card information using the stored value card gateway of the vendor.

2. The method of claim 1, wherein identifying the connection between the first user and the second user includes determining that the first user and the second user have previously exchanged a gift over the network.

3. The method of claim 2, wherein the gift is an offer exchanged between the first user and the second user.

4. The method of claim 1, wherein identifying the preference associated with the second user includes analyzing a feedback by the second user on a social network.

5. The method of claim 1, wherein the preference includes at least one of a dining preference, an event preference, a travel preference, a recreational activity preference, a health preference, and a retail preference.

6. The method of claim 1, further comprising:

identifying a location of the first user device via a GPS receiver, wherein generating the tailored discount for the first user comprises selecting a certain percentage discount based on the location of the first user device.

7. The method of claim 1, wherein generating the tailored discount for the first user includes identifying that a calendar date is associated with a special occasion.

8. The method of claim 1, wherein transmitting the tailored discount to the first user device causes the first user device to display the tailored discount.

9. The method of claim 1, further comprising:

transmitting the tailored discount from the first user to a third user wherein transmitting the tailored discount establishes a connection between the first user and the third user;

generating a second tailored discount for the first user that is tailored based on a preference associated with the third user; and transmitting the second tailored discount to the first user device over the network.

10. The method of claim 1, further comprising implementing limitations or controls on the tailored discount by:

requiring that a user profile of the first user meets a specific requirement in order for the first user to be given access to discounts on certain goods or services.

11. The method of claim 1, wherein generating the tailored discount in real-time comprises applying a percentage discount to a good or service offered by the vendor.

12. The method of claim 1, wherein the tailored discount is dynamically updated based on one or more of a number of offer redemptions, a number of plays, or a number of wins associated with the tailored discount, and wherein a graphical user interface corresponding to the tailored discount is modified to reflect the update of the tailored discount.

13. The method of claim 1, wherein:

the application is integrated into a social networking outlet, the tailored discount was further generated based on registration information of the second user, and the first user and the second user are connected via the social networking outlet.

14. The method of claim 1, wherein:

redeeming the tailored discount further comprises submitting a payment associated with the tailored discount, wherein a first portion of the payment is processed using the stored value card information and a remaining portion of the payment is processed using the credit card payment information.

15. A system for tailored messaging, the system comprising:

a first user device associated with a first user;

a network that is communicatively coupled to the first user device; and a processor that executes instructions stored in memory, wherein execution of the instructions by the processor:

identifies a connection between the first user and a second user;

receives a user parameter identifying a preference associated with the second user;

receives one or more offers from a vendor and one or more rules specified by the vendor;

matches the user parameter with an offer of the one or more offers, based on the one or more rules specified by the vendor;

generates, in real time, a tailored discount for the first user based on the matched offer, the preference associated with the second user and the one or more rules specified by the vendor, wherein the preference associated with the second user comprises user feedback from the second user in the form of a posting or message on a social networking site, an email message, or a short message service (SMS) message comprising a comment or criticism submitted by the second user regarding the vendor or a good or service provided by the vendor;

wherein generating the tailored discount comprises implementing limitations or controls on the tailored discount, based on the one or more rules specified by the vendor, by one or more of:

limiting a maximum percentage discount applied to certain goods or services, or prohibiting discounts on certain goods or services;

transmits the tailored discount to the first user device over the network, wherein the first user device is configured to display the tailored discount, and wherein receipt of a selection of a user interface element displayed within the tailored discount causes the tailored discount to be sent to a second user device associated with the second user, and wherein sending the tailored discount to the second user device enables the second user device to install an application, if not previously installed, configured to display the tailored discount, wherein the application is hosted by an application server, and wherein the application server comprises a proxy between the second user device and one or more of: a point-of-sale gateway for the vendor or a stored value card gateway;

scans, by a device of the vendor and via the application, the tailored discount; and redeems, by the vendor, based on scanning the tailored discount, and on behalf of the second user, the tailored discount, wherein redeeming the tailored discount comprises one or more:

processing the tailored discount and credit card payment information with the point-of-sale gateway, or processing the tailored discount and stored value card information using the stored value card gateway of the vendor.

16. The system of claim 15, wherein identifying the connection between the first user and the second user includes determining that the first user is coupled to the second user in a social network.

17. The system of claim 15, wherein identifying the connection between the first user and the second user includes determining that the first user and the second user have previously exchanged a gift over the network.

18. The system of claim 15, further comprising a GPS receiver that is used to identify a location of the first user device, wherein generating the tailored discount for the first user comprises selecting a certain percentage discount based on the location of the first user device.

19. The system of claim 15, wherein generating the tailored discount for the first user includes identifying that a calendar date is associated with a special occasion.

20. The system of claim 15, wherein the processor executes further instructions to:

transmit the tailored discount from the first user to a third user wherein transmitting the tailored discount establishes a connection between the first user and the third user;

generate a second tailored discount for the first user that is tailored based on a preference associated with the third user; and transmit the tailored discount to the first user device over the network.

21. A non-transitory computer-readable storage medium, having embodied thereon a program, the program being executable by a processor to perform a method for tailored messaging, the method comprising:

identifying that a first user device associated with a first user is communicatively coupled to a network;

identifying a connection between the first user and a second user;

receiving a user parameter identifying a preference associated with the second user;

receiving one or more offers from a vendor and one or more rules specified by the vendor;

matching the user parameter with an offer of the one or more offers, based on the one or more rules specified by the vendor;

generating, in real time, a tailored discount for the first user based on the matched offer, the preference associated with the second user and the one or more rules specified by the vendor, wherein the preference associated with the second user comprises user feedback from the second user in the form of a posting or message on a social networking site, an email message, or a short message service (SMS) message comprising a comment or criticism submitted by the second user regarding the vendor or a good or service provided by the vendor;

wherein generating the tailored discount comprises implementing limitations or controls on the tailored discount, based on the one or more rules specified by the vendor, by one or more of:

limiting a maximum percentage discount applied to certain goods or services, or prohibiting discounts on certain goods or services;

transmitting the tailored discount to the first user device over the network;

displaying, at the first user device, the tailored discount;

receiving, at the first user device, selection of a user interface element displayed within the tailored discount, wherein the selection of the user interface element causes the tailored discount to be sent to a second user device associated with the second user, and wherein sending the tailored discount to the second user device causes the second user device to install an application, if not previously installed, configured to display the tailored discount, wherein the application is hosted by an application server, and wherein the application server comprises a proxy between the second user device and one or more of: a point-of-sale gateway for the vendor or a stored value card gateway;

scanning, by a device of the vendor and via the application, the tailored discount; and redeeming, by the vendor, based on scanning the tailored discount, and on behalf of the second user, the tailored discount, wherein redeeming the tailored discount comprises one or more of:

processing the tailored discount and credit card payment information with the point-of-sale gateway, or processing the tailored discount and stored value card information using the stored value card gateway of the vendor.

* * * * *